US006950141B2

United States Patent
Mori et al.

(10) Patent No.: US 6,950,141 B2
(45) Date of Patent: Sep. 27, 2005

(54) CAMERA THAT CONTROLS IMAGE SENSOR EXPOSURE

(75) Inventors: Yukio Mori, Hirakata (JP); Seiji Okada, Hirakata (JP); Tetsuo Mise, Hirakata (JP); Shoichi Hasegawa, Osaka (JP)

(73) Assignee: Sanyo Electric Co., LTD, Osaka (JP)

( * ) Notice: Subject to any disclaimer, the term of this patent is extended or adjusted under 35 U.S.C. 154(b) by 790 days.

(21) Appl. No.: 09/851,426

(22) Filed: May 9, 2001

(65) Prior Publication Data

US 2002/0006283 A1 Jan. 17, 2002

(30) Foreign Application Priority Data

May 12, 2000 (JP) ...................................... 2000-141010

(51) Int. Cl.⁷ .......................... H04N 5/235; H04N 7/00
(52) U.S. Cl. .................................. 348/362; 348/229.1
(58) Field of Search ................................ 348/362, 363, 348/364, 366, 229.1, 254, 365; 382/274; 358/518, 519, 520

(56) References Cited

U.S. PATENT DOCUMENTS

| | | | |
|---|---|---|---|
| 5,031,048 A | * 7/1991 | Naruto et al. | 348/296 |
| 5,093,716 A | * 3/1992 | Kondo et al. | 348/224.1 |
| 5,353,058 A | * 10/1994 | Takei | 348/363 |
| 5,703,644 A | * 12/1997 | Mori et al. | 348/363 |
| 5,940,530 A | 8/1999 | Fukushima et al. | |
| 6,570,620 B1 | * 5/2003 | Yoshimura et al. | 348/362 |

FOREIGN PATENT DOCUMENTS

| | | |
|---|---|---|
| EP | 0 570 968 A2 | 5/1993 |
| EP | 0 720 361 A2 | 7/1996 |
| JP | 4-78829 | 3/1992 |
| JP | 06-046325 | 2/1994 |
| JP | 08-125926 | 5/1996 |
| JP | 11-202378 | 7/1999 |

* cited by examiner

Primary Examiner—Wendy R. Garber
Assistant Examiner—Justin Misleh
(74) Attorney, Agent, or Firm—Arent & Fox PLLC

(57) ABSTRACT

An automatic exposure control camera always permits a subject to be photographed with appropriate brightness regardless of a front-lighted, back-lighted, or over-front-lighted condition. The area to be photographed is divided into 64 regions. The camera determines the average Yav64 of brightness over all the regions, the average YavU32 of brightness in the regions constituting the upper half, the average YavL32 of brightness in the regions constituting the lower half, the average YavD1 of brightness in regions in which brightness is lower than the average Yav64, the average YavD2 of brightness in regions in which brightness is lower than the average YavD1, the average YavB1 of brightness in regions in which brightness is higher than the average Yav64, and the average YavB2 of brightness in regions in which brightness is higher than the average YavB1. Based on the ratios between these averages, the camera distinguishes among a front-lighted, a back-lighted, and an over-front-lighted condition and controls the exposure of an image sensor accordingly.

13 Claims, 5 Drawing Sheets

CAMERA THAT CONTROLS IMAGE SENSOR EXPOSURE

BACKGROUND OF THE INVENTION

1. Field of the Invention

The present invention relates to a camera having a function of controlling the exposure of an image sensor so that a subject is photographed with appropriate brightness.

2. Description of the Prior Art

A camera is provided with an automatic exposure (AE) control function for controlling the exposure of an image sensor according to the brightness of a subject so that the subject, i.e. the main object to be photographed, is photographed with appropriate brightness. Such an AE function is provided not only in cameras such as video cameras and digital cameras that perform photoelectric conversion as an image sensor but also in cameras that use sensitized film as an image sensor.

In general, an AE function is achieved by determining the average brightness over a whole area that is going to be photographed and then adjusting the aperture diameter of an iris, or an aperture stop, so that the brightness so determined becomes equal to a predetermined value. This permits a subject to be photographed with appropriate brightness almost unfailingly in a front-lighted condition in which both the subject and the background are illuminated from the front (from the camera side) and there is little difference in brightness between the subject and the background. However, in a back-lighted condition in which the subject is illuminated from behind and the brightness of the subject is extremely low relative to the brightness of the background, the subject photographed appears dark. To avoid this, it is customary to determine the average brightness in different manners between in a front-lighted and a back-lighted condition so that a subject is photographed with appropriate brightness even against an extremely bright background. This treatment is called back-lighting compensation.

In conventional cameras provided with an AE function, a whole area to be photographed is divided into a plurality of regions, then brightness is determined in each of those regions, and then the aperture diameter of the iris is adjusted so that the average brightness over all those regions becomes equal to a predetermined target value. As the average brightness, an arithmetic average is used when back-lighting compensation is not performed, and a weighted average is used when back-lighting compensation is performed.

An example of weight factors used to determine a weighted average is shown in FIG. 6. In this example, the whole area to be photographed is divided into 64 regions, of which 24 regions R1 located in a central and a lower portion are assigned a weight factor of 1, 16 regions R2 located near the central portion are assigned a weight factor of 0.5, and the remaining 24 regions R3 located in an upper, a left-hand end, and a right-hand end portion are assigned a weight factor of 0. As long as a subject lies in the central and lower portions of the area to be photographed, the brightness of the background, lying in the upper, left-hand end, and right-hand end portions, is not reflected in the average brightness, and thus it is possible to photograph the subject with appropriate brightness.

In this way, in conventional cameras, back-lighting compensation is achieved by exploiting the fact that a subject is very likely to lie in a central or lower portion of an area to be photographed, and thus by using constant weight factors.

Examples of pictures taken with a conventional camera are shown in FIGS. 8A and 8B. FIG. 8A shows a picture taken without back-lighting compensation in a back-lighted condition. In this picture, the subject in a central portion appears dark. FIG. 8B shows a picture taken with back-lighting compensation in the same back-lighted condition. In this picture, the subject in a central portion appears appropriately bright.

However, a subject does not always lie in a central or lower portion of an area to be photographed, and this often makes it impossible to photograph the subject with appropriate brightness. FIG. 7 shows an example of brightness distribution that poses such a problem. FIG. 7 shows a subject (for example, two persons) lying in a left-hand end and a right-hand end portion of the area to be photographed in a back-lighted condition. Here, brightness is high in 28 regions RH, illustrated without hatching, located in a central and an upper portion, and brightness is increasingly low in the regions RM and RL, in this order, located in the left-hand end and right-hand end portions. Since the weight factor is great in the central portion, the high brightness of the background contributes greatly to the weighted average, and thus the subject appears dark in the picture taken. FIG. 8C shows an example of a picture in which the subject is not photographed with appropriate brightness even when back-lighting compensation is performed.

This problem can be overcome by distinguishing a front-lighted and a back-lighted condition on the basis of the difference in brightness observed within the area to be photographed and, if a back-lighted condition is recognized, adjusting the exposure of the image sensor so that the average brightness in low-brightness regions becomes equal to the target value. However, there may also occur an over-front-lighted condition in which a subject is illuminated from the front in such a way that the brightness of the subject is extremely high relative to the brightness of the background. Thus, simply distinguishing a front-lighted and a back-lighted condition does not permit a subject to be photographed with appropriate brightness in an over-front-lighted condition.

SUMMARY OF THE INVENTION

An object of the present invention is to provide a camera that always permits a subject to be photographed with appropriate brightness.

To achieve the above object, according to one aspect of the present invention, a camera that controls the exposure of an image sensor in such a way that the apparent brightness of a subject in a picture taken is substantially constant regardless of the actual brightness of the subject controls the exposure of the image sensor according to the result of distinguishing among a first condition in which there is little difference in brightness between the subject and a background, a second condition in which there is much difference in brightness between the subject and the background and in which the subject is less bright than the background, and a third condition in which there is much difference in brightness between the subject and the background and in which the subject is brighter than the background.

This camera distinguishes among three conditions in terms of the brightness of the subject relative to that of the background, and performs AE control according to the result. The first, second, and third conditions correspond to a front-lighted, a back-lighted, and an over-front-lighted condition, respectively. Distinguishing not only a front-lighted and a back-lighted condition but also an over-front-lighted condition helps prevent erroneously recognizing an over-front-lighted condition as a back-lighted condition, and thus makes it possible to photograph the subject always with appropriate brightness. In a video camera or digital camera, the photoelectric conversion device itself that is used as an image sensor therein can be used as a means for detecting brightness. In a camera that uses photographic film as an image sensor, a means for detecting brightness needs to be provided separately.

Here, the camera may be so configured as to first distinguish between a fourth condition including the first and second conditions and a fifth condition including the first and third conditions and then distinguish, when the fourth condition has been recognized, between the first and second conditions or, when the fifth condition has been recognized, between the first and third conditions. Whereas distinguishing the first condition from the other conditions first makes it difficult to distinguish between the second and third conditions, distinguishing the fourth condition including the second condition and the fifth condition including the third condition first makes it possible to distinguish between the second and third conditions easily and reliably.

The camera may be so configured that the area to be photographed is divided into two, an upper and a lower, portions each further divided into a plurality of regions, and that the camera determines brightness in each of those regions and then determines an upper-portion average, which is the average of brightness in the regions belonging to the upper portion, and a lower-portion average, which is the average of brightness in the regions belonging to the lower portion, so that the camera recognizes the fourth condition when the upper-portion/lower-portion ratio, which is the ratio of the upper-portion average to the lower-portion average, is higher than a predetermined reference upper-portion/lower-portion ratio and recognizes the fifth condition when the upper-portion/lower-portion ratio is not higher than the reference upper-portion/lower-portion ratio.

These averages need only to be determined as arithmetic averages, and therefore there is no need to determine weight factors. Except in extremely special photographing conditions, the subject lies in a lower portion of the area to be photographed, and therefore the brightness of the subject is reflected in the lower-portion average. That is, the upper-portion/lower-portion ratio, which is the ratio of the upper-portion average to the lower-portion average, is higher in the second condition and lower in the third condition. Thus, by comparing the upper-portion/lower-portion ratio with the reference upper-portion/lower-portion ratio, it is possible to distinguish between the fourth and fifth conditions reliably.

The reference upper-portion/lower-portion ratio may be made lower when the second condition was recognized last time than when the first or third condition was recognized. If the reference upper-portion/lower-portion ratio is kept constant regardless of the distinction made last time, when the upper-portion/lower-portion ratio is close to the reference upper-portion/lower-portion ratio, slight variations in brightness cause frequent reversal of recognition between the fourth and fifth conditions. This can be avoided by making the reference upper-portion/lower-portion ratio lower when the second condition was recognized last time.

The camera may be so configured as to determine an overall average, which is the average of brightness over all the regions, a first dark-region average, which is the average of brightness in regions in which brightness is lower than the overall average, and a second dark-region average, which is the average of brightness in regions in which brightness is lower than the first dark-region average so that, when the fourth condition has been recognized, the camera recognizes the first condition when a first overall/dark-region ratio, which is the ratio of the overall average to the first dark-region average, is not higher than a first reference overall/dark-region ratio or when a second overall/dark-region ratio, which is the ratio of the overall average to the second dark-region average, is not higher than a second reference overall/dark-region ratio and recognizes the second condition when the first overall/dark-region ratio is higher than the first reference overall/dark-region ratio and in addition the second overall/dark-region ratio is higher than the second reference overall/dark-region ration.

The overall/dark-region ratios, which are the ratios of the overall average to the dark-region averages, represent how low brightness is in low-brightness regions relative to the brightness over the whole area to be photographed. Specifically, the higher the overall/dark-region ratios, the lower brightness in low-brightness regions. Thus, by comparing the overall/dark-region ratios with the reference overall/dark-region ratios, it is possible to distinguish between the first and second conditions. Here, by determining the first dark-region average, which is the average of brightness in regions in which brightness is lower than the overall average, and the second dark-region average, which is the average of brightness in regions in which brightness is lower than the first dark-region average, it is possible to recognize how low brightness is over all low-brightness regions and how low brightness is in particularly low-brightness regions among those low-brightness regions. The second condition is recognized only when both the first and second overall/dark-region ratios are higher than the first and second reference overall/dark-region ratios, respectively, and otherwise the first condition is recognized. This makes it possible to distinguish between the first and second conditions unfailingly.

The first and second reference overall/dark-region ratios may be made lower when the second condition was recognized last time than when the first condition was recognized. This helps prevent variations in brightness from causing frequent reversal of recognition between the first and second conditions.

The camera may be so configured as to determine an overall average, which is the average of brightness over all the regions, a dark-region average, which is the average of brightness in regions in which brightness is lower than the overall average, and a bright-region average, which is the average of brightness in regions in which brightness is higher than the overall average so that, when the fifth condition has been recognized, the camera recognizes the first condition when the bright-region/dark-region ratio, which is the ratio of the bright-region average to the dark-region average, is not higher than a predetermined reference bright-region/dark-region ratio and recognizes the third condition when the bright-region/dark-region ratio is higher than the reference bright-region/dark-region ratio.

The bright-region/dark-region ratio, which is the ratio of the bright-region average to the dark-region average, represents how high brightness is in high-brightness regions relative to the brightness in low-brightness regions. Specifically, the higher the bright-region/dark-region ratio, the greater the difference in brightness. Thus, by comparing the bright-region/dark-region ratio with the reference bright-region/dark-region ratio, it is possible to distinguish between the first and third conditions unfailingly.

The reference bright-region/dark-region ratio may be made lower when the third condition was recognized last time than when the first condition was recognized. This helps prevent variations in brightness from causing frequent reversal of recognition between the first and third conditions.

The camera may be so configured that an area to be photographed is divided into a plurality of regions, and that the camera determines brightness in each of those regions and then determines an overall average, which is the average of brightness over all the regions, a first dark-region average, which is the average of brightness in regions in which brightness is lower than the overall average, a second dark-region average, which is the average of brightness in regions in which brightness is lower than the first dark-region average, a first bright-region average, which is the average of brightness in regions in which brightness is higher than the overall average, and a second bright-region average, which is the average of brightness in regions in which brightness is higher than the first bright-region average so that the camera controls the exposure of the image sensor by using, as the brightness of the subject, the overall average when the first condition is recognized, the second dark-region average when the second condition is recognized, and the second bright-region average when the third condition is recognized.

When the first condition is recognized, in which there is little difference in brightness between the subject and the background, using the overall average, which is the average of brightness over all the regions, as the brightness of the subject makes it possible to photograph the subject with appropriate brightness. When the second condition is recognized, in which the brightness of the subject is remarkably low relative to that of the background, using the second dark-region average, which is the average of brightness in regions in which brightness is particularly low, as the brightness of the subject makes it possible to photograph the subject with appropriate brightness. When the third condition is recognized, in which the brightness of the subject is remarkably high relative to that of the background, using the second bright-region average, which is the average of brightness in regions in which brightness is particularly high, as the brightness of the subject makes it possible to photograph the subject with appropriate brightness.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
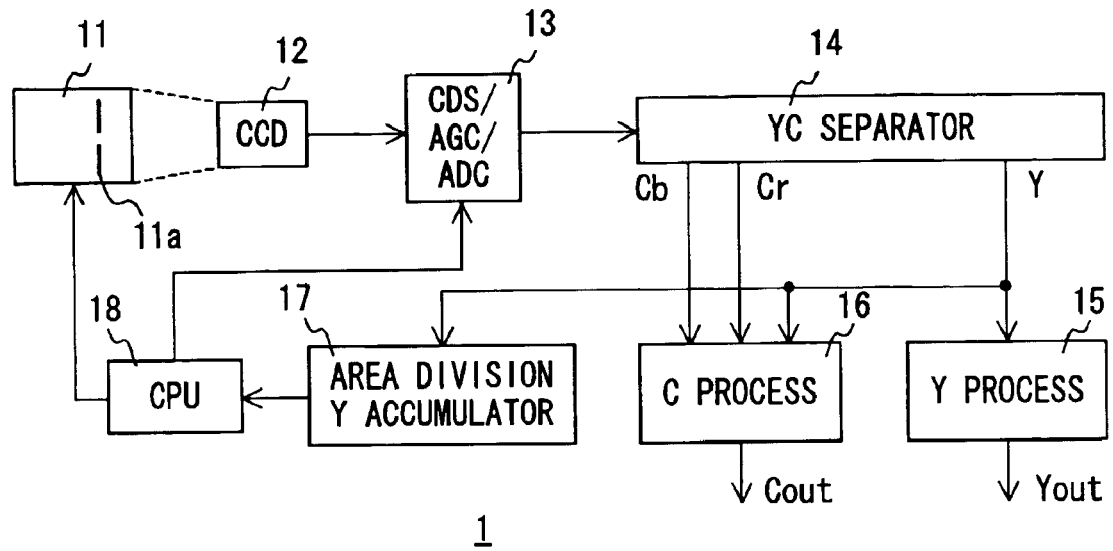
FIG. 1 is a block diagram schematically showing an outline of the configuration of a video camera embodying the invention.

Hereinafter, a video camera embodying the present invention will be described with reference to the drawings. An outline of the configuration of the video camera (hereinafter referred to simply as the "camera" also) of this embodiment is shown in FIG. 1. The camera 1 is provided with a taking lens 11, a CCD 12 serving as an image sensor, an analog processing circuit 13, a YC separator circuit 14, a Y process circuit 15, a C process circuit 16, a Y accumulator circuit 17, and a CPU 18.

The taking lens 11 images the light from an area to be photographed on the light-sensing surface of the CCD12. The taking lens 11 is provided with an aperture stop (iris) 11a of which the aperture diameter is variable. Thus, by varying the aperture diameter of the aperture stop 11a, it is possible to adjust the exposure of the CCD 12.

The CCD 12 performs photographing by converting light into electric signals. The pixels of the CCD 12 are each provided with a filter that selectively transmits magenta, cyan, green, or yellow light so that all the pixels are divided into four types. These four types of pixels are arranged one after another in predetermined order two-dimensionally and recurrently. The photographing by the CCD 12 is performed at regular time intervals (for example, every 1/30 second).

The analog processing circuit 13 is composed of a CDS (correlative double sampling) circuit, an AGC (automatic gain control) circuit, and an ADC (analog-to-digital conversion) circuit. The CDS circuit reduces the noise included in the analog signals output from the CCD 12. The AGC circuit adjusts the levels of all signals fed from the CDS circuit according to the gain at which the AGC circuit is set. The ADC circuit converts the analog signals fed from the AGC circuit into digital signals of a predetermined number of bits (for example, 10 bits).

The YC separator circuit 14 processes the signals output from the CCD 12 and then digitized by the ADC circuit to separate luminance signals (Y signals) and chrominance signals (Cr and Cb signals). The Y process circuit 15 subjects the Y signals output from the YC separator circuit 14 to processing including superimposition thereon of horizontal and vertical synchronizing signals, and thereby produces luminance signals Yout that represent the brightness of the image photographed. The C process circuit 16 processes the Y signals, Cr signals, and Cb signals output from the YC separator circuit 14 to produce chrominance signals Cout that represent the hues (intensity of R, G, and B relative to one another) of the image photographed. The luminance signals Yout and the chrominance signals Cout are fed to an external display or recording device for display or recording of the image photographed.

The camera 1 is provided with an AE function, which is controlled by the CPU 18. Specifically, the CPU 18 adjusts the exposure of the CCD 12 by setting the aperture diameter of the aperture stop 11a according to the intensity of the Y signals output from the YC separator circuit 14 so that the subject, i.e. the main object to be photographed, is photographed with appropriate brightness. When the brightness of the subject is below predetermined brightness even with the aperture stop 11a opened to its maximum aperture diameter, or when the brightness of the subject is above the predetermined brightness even with the aperture stop 11a stopped to its minimum aperture diameter, the CPU 18 varies the gain of the AGC circuit provided in the analog processing circuit 13. This makes it possible to obtain luminance signals Yout that bring the subject to the predetermined brightness even in a photographing condition in which simply adjusting the exposure is not sufficient to control the brightness of the image photographed.

The camera 1 operates in either of two modes with respect to AE control. In a first mode, the relationship between the brightness of the subject and that of the background is grouped into a first, a second, and a third condition, and AE control is performed on the basis of the result of recognizing in which of these three conditions the brightness of the subject and that of the background currently are. Here, the first condition denotes a condition in which there is little difference in brightness between the subject and the background. The second condition denotes a condition in which there is much difference in brightness between the subject and the background and the subject is less bright than the background. The third condition denotes a condition in which there is much difference in brightness between the subject and the background and the subject is brighter than the background. Thus, the first, second, and third conditions correspond to a front-lighted, a back-lighted, and an over-front-lighted condition, respectively.

In a second mode, AE control is performed on the basis of the average brightness over the whole area to be photographed regardless of the relationship between the brightness of the subject and that of the background. It is possible to switch between the first and second modes freely so that the camera 1 operates in the mode specified by its user.

In either mode, the area to be photographed is divided into a plurality of regions, and brightness is determined in each of those regions. On the basis of the brightness thus determined in the individual regions, the three conditions are distinguished in the first mode, and the average brightness over the whole area to be photographed is calculated in the second mode. The determination of brightness in each region is handled by the Y accumulator circuit 17, and the distinction among the three conditions and the calculation of the average brightness are handled by the CPU 18.

Figure 2:
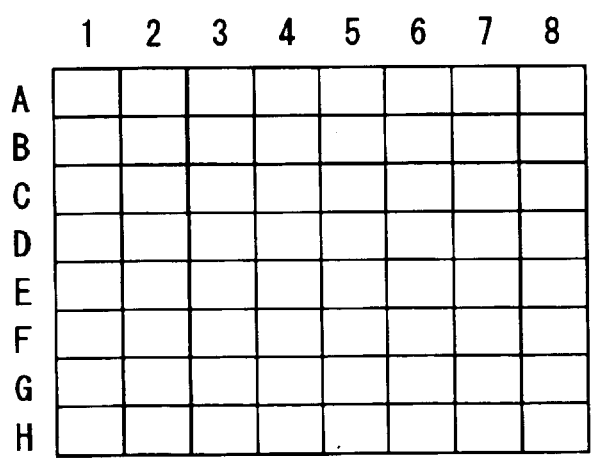
FIG. 2 is a diagram showing how the area to be photographed is divided into regions to permit distinction among different conditions in the video camera shown in FIG. 1.

FIG. 2 shows the area to be photographed as divided into a plurality of regions. Here, the whole area to be photographed is divided into eight parts both vertically and horizontally so as to be divided into 64 regions A1 to H8. The area to be photographed as a whole corresponds to that portion of the surface of the CCD 12, serving as an image sensor, which the YC separator circuit 14 uses to produce Y, Cr, and Cb signals. It is to be noted, however, that the division of the area to be photographed is achieved not by physically dividing the CCD 12 in some way but as a result of the Y accumulator circuit 17 accumulating the Y signals fed from the YC separator circuit 14 separately for each of the regions shown in FIG. 2.

Now, how AE control is performed in the first mode will be described. In this mode, the three conditions are distinguished as described previously. To achieve this, first a fourth condition including the first and second conditions and a fifth condition including the first and third conditions are distinguished, and then the first and second conditions, or the first and third conditions, are distinguished. The reason for doing this is to distinguish between the second and third conditions reliably.

If first the first condition is distinguished from the second and third conditions and then the second and third conditions are distinguished, it is difficult to distinguish between the second and third conditions. The reasons are that these conditions are the same in that there is much difference in brightness between the subject and the background, and differ only in which of the subject and the background is brighter, and in addition that there is no way to anticipate where in the area to be photographed the subject will lie, and therefore it is impossible to unfailingly locate the regions that correspond to the subject. By distinguishing between the fourth and fifth conditions first, it is possible to preclude situations that require tricky distinction between the second and third conditions, and thereby eliminate the need to locate the regions that correspond to the subject.

The fourth and fifth conditions are distinguished by calculating the average brightness YavU32 in the 32 regions belonging to the upper half (rows A to D in FIG. 2) of the area to be photographed and the average brightness YavL32 in the 32 regions belonging to the lower half (rows E to H in FIG. 2) thereof, and then checking whether the ratio YrtUL of the former to the latter is higher than a predetermined reference value R1 or not. Except in extremely special cases, at least part of the subject lies in the lower half of the area to be photographed, and the greater part of the upper half thereof corresponds to the background. Accordingly, the average brightness YavL32 in the lower half reflects the brightness of the subject, and the average brightness YavU32 in the upper half reflects the brightness of the background. Hence, the higher the ratio YrtUL, the greater the degree in which the background is brighter than the subject. Thus, the fourth condition is recognized if the ratio YrtUL is higher than the reference value R1 and the fifth condition is recognized otherwise.

To distinguish between the first and second conditions, first the average brightness Yav64 over all the regions, the average brightness YavD1 in regions in which brightness is lower than the average brightness Yav64, and the average brightness YavD2 in regions in which brightness is still lower than the average brightness YavD1 are calculated. Then, the first and second conditions are distinguished by checking whether the ratio YrtD1 of the average brightness Yav64 to the average brightness YavD1 and the ratio YrtD2 of the average brightness Yav64 to the average brightness YavD2 are higher than predetermined reference values R2 and R3, respectively, or not. The average brightness YavD1 represents how low the brightness in low-brightness regions is relative to the brightness over the whole area to be photographed, and the average brightness YavD2 represents how low the brightness in particularly low-brightness regions is relative to the brightness over the whole area to be photographed.

The reference value R3 is set to be higher than the reference value R2, so that the second condition is recognized if the ratio YrtD1 is higher than the reference value R2 and in addition the ratio YrtD2 is higher than the reference value R3, and the first condition is recognized otherwise. By taking into consideration not only the brightness over all low-brightness regions but also the brightness in particularly low-brightness regions in this way, it is possible to distinguish between the first and second conditions more reliably.

To distinguish between the first and third conditions, first the average brightness YavD1 in regions in which brightness is lower than the average brightness Yav64 over all the regions, the average brightness YavB1 in regions in which brightness is higher than the average brightness Yav64, and the average brightness YavB2 in regions in which brightness is still higher than the average brightness YavB1. Then, the third condition is recognized if the ratio YrtBD of the average brightness YavB1 to the average brightness YavD1 is higher than a predetermined reference value R4 or not, and the first condition is recognized otherwise. The ratio YrtBD represents how high the brightness in high-brightness regions is relative to the brightness in low-brightness regions. Hence, the higher the ratio YrtBD, the greater the difference in brightness. Thus, by comparing the ratio YrtBD with the reference value R4, it is possible to distinguish between the first and third conditions. Here, the average brightness YavB2 is not used to distinguish conditions.

When the first condition is recognized, the average brightness Yav64 over all the regions is used as the brightness of the subject. When the second condition is recognized, the average brightness YavD2 in particularly low-brightness regions is used as the brightness of the subject. When the third condition is recognized, the average brightness YavB2 in particularly high-brightness regions is used as the brightness of the subject. Then, the aperture diameter of the aperture stop 11a is adjusted according to whether the brightness of the subject thus determined is higher or lower than a predetermined target value.

In distinguishing among the three conditions, four reference values R1, R2, R3, and R4 are used. These values are not kept constant, but are each chosen between two values according to the result of the distinction made last time, i.e. according to which condition is currently being recognized. Specifically, the reference value R1 is chosen between R1a and R1b, the reference value R2 between R2a and R2b, the reference value R3 between R3a and R3b, and the reference value R4 between R4a and R4b, where R1b<R1a, R2b<R2a, R3b<R3a, and R4b<R4a. For example, R1a=1, R1b=0.5, R2a=2.0, R2b=1.8, R3a=3.0, R3b=2.8, R4a=3.3, and R4b=3.1.

As the reference value R1, the larger value R1a is used when the first or third condition is currently being recognized, and the smaller value R1b is used when the second condition is currently being recognized. As the reference values R2 and R3, the larger values R2a and R3a are used when the first condition is currently being recognized, and the smaller values R2b and R3b are used otherwise. As the reference value R4, the larger value R4a is used when the first condition is currently being recognized, and the smaller value R4b is used otherwise.

If these reference values are kept constant, when one of the ratios calculated is close to its reference value, slight variations in brightness in the area to be photographed cause frequent reversal of the result of condition recognition. For example, suppose that the ratio YrtUL is now slightly higher than the reference value R1 and thus the fourth condition is being recognized. Then, a slight variation in brightness makes the ratio YrtUL slightly smaller than the reference value R1, and thus causes the fifth condition to be recognized. Then, another slight variation in brightness makes the ratio YrtUL slightly greater than the reference value R1, and thus causes the fourth condition to be recognized again. This is undesirable because such frequent reversal of the result of condition recognition causes fluctuations in the brightness of the image photographed, and thus flickering of the image.

By setting the reference values R1, R2, R3, and R4 as described above, it is possible to maintain the currently recognized condition as long as possible, and thereby prevent flickering of the image photographed.

Figure 3:
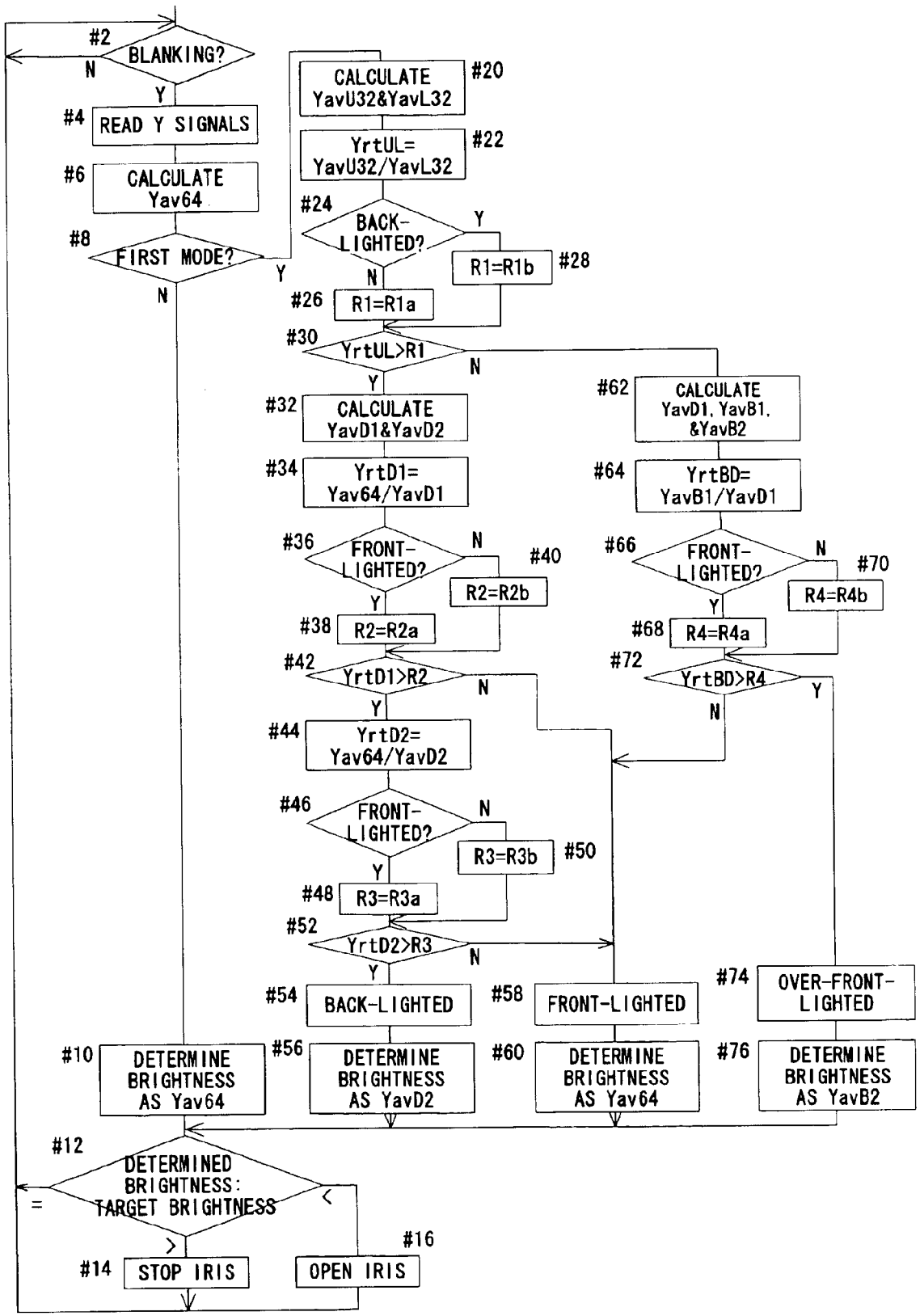
FIG. 3 is a flow chart showing the flow of operations performed to achieve AE control in the video camera shown in FIG. 1.

Now, the flow of operations performed to achieve AE control in the camera 1 will be described with reference to the flow chart shown in FIG. 3. First, whether now is a vertical blanking period or not is checked and, if not, a vertical blanking period is waited for (step #2). In a vertical blanking period, Y signals are read out, and brightness is determined in each of the 64 regions (#4). Then, the average brightness Yav64 over all the regions is calculated as an arithmetic average (#6). Next, whether the camera 1 is operating in the first mode or not is checked (#8).

If the camera 1 is not operating in the first mode, but is operating in the second mode, the brightness of the subject is determined to be equal to the average brightness Yav64 over all the regions (#10), and then the brightness of the subject is compared with predetermined target brightness (#12). If the brightness of the subject is equal to the target brightness, the flow returns to step #2 without varying the aperture diameter of the aperture stop 11a. If the brightness of the subject is higher than the target brightness, the aperture diameter of the aperture stop 11a is made smaller (#14), and then the flow returns to step #2. If the brightness of the subject is lower than the target brightness, the aperture diameter of the aperture stop 11a is made larger (#16), and then the flow returns to step #2.

If the camera 1 is operating in the first mode, the average brightness YavU32 in the 32 regions constituting the upper half of the area to be photographed and the average brightness YavL32 in the 32 regions constituting the lower half thereof are calculated respectively as arithmetic averages (#20), and then the ratio YrtUL of the average brightness YavU32 to the average brightness YavL32 is calculated (#22). Then, whether the second condition (a back-lighted condition) is currently being recognized or not is checked (#24) so that, if so, the value R1b is chosen as the reference value R1 (#28) and, if not, the value R1a is chosen as the reference value R1 (#26).

Next, whether the ratio YrtUL is higher than the reference value R1 or not is checked (#30) so that, if so, the flow proceeds to step #32 and, if not, the flow proceeds to step #62. Thus, the distinction between the fourth and fifth conditions is complete.

The steps starting with step #32 involve operations performed, when the fourth condition is recognized, to proceed to distinguish between the first and second conditions. First, the average brightness YavD1 in regions in which brightness is lower than the average brightness Yav64 over all the regions and the average brightness YavD2 in regions in which brightness is lower than the average brightness YavD1 are calculated respectively as arithmetic averages (#32), and then the ratio YrtD1 of the average brightness Yav64 to the average brightness YavD1 is calculated (#34). Then, whether the first condition (a front-lighted condition) is currently being recognized or not is checked (#36) so that, if so, the value R2a is chosen as the reference value R2 (#38) and, if not, the value R2b is chosen as the reference value R2 (#40).

Next, whether the ratio YrtD1 is higher than the reference value R2 or not is checked (#42). If the ratio YrtD1 is higher than the reference value R2, the ratio YrtD2 of the average brightness Yav64 to the average brightness YavD2 is calculated (#44). Moreover, whether the first condition (a front-lighted condition) is currently being recognized or not is checked (#46) so that, if so, the value R3a is chosen as the reference value R3 (#48) and, if not, the value R3b is chosen as the reference value R3 (#50). Then, whether the ratio YrtD2 is higher than the reference value R3 or not is checked (#52).

Here, if the ratio YrtD2 is higher than the reference value R3, the second condition (a back-lighted condition) is recognized (#54), and the brightness of the subject is determined to be equal to the average brightness YavD2 (#56). Then, the flow proceeds to step #12 to perform the operations described above.

If, in step #42, the ratio YrtD1 is not higher than the reference value R2, or if, in step #52, the ratio YrtD2 is not higher than the reference value R3, the first condition, i.e. a front-lighted condition, is recognized (#58), and the brightness of the subject is determined to be equal to the average brightness Yav64 (#60). Then, the flow proceeds to step #12 to perform the operations described above.

The steps starting with step #62 involve operations performed, when the fifth condition is recognized, to proceed to distinguish between the first and third conditions. First, the average brightness YavD1 in regions in which brightness is lower than the average brightness Yav64 over all the regions, the average brightness YavB1 in regions in which brightness is higher than the average brightness Yav64, and the average brightness YavB2 in regions in which brightness is higher than the average brightness YavB1 are calculated respectively as arithmetic averages (#62), and then the ratio YrtBD of the average brightness YavB1 to the average brightness YavD1 is calculated (#64). Then, whether the first condition (a front-lighted condition) is currently being recognized or not is checked (#66) so that, if so, the value R4a is chosen as the reference value R4 (#68) and, if not, the value R4b is chosen as the reference value R4 (#70).

Next, whether the ratio YrtBD is higher than the reference value R4 or not is checked (#72), and, if not, the flow proceeds to step #58, where the first condition, i.e. a front-lighted condition, is recognized. If the ratio YrtBD is higher than the reference value R4, the third condition, i.e. an over-front-lighted condition, is recognized (#74), and the brightness of the subject is determined to be equal to the average brightness YavB2 (#76). Then, the flow proceeds to step #12 to perform the operations described above.

Figure 5:
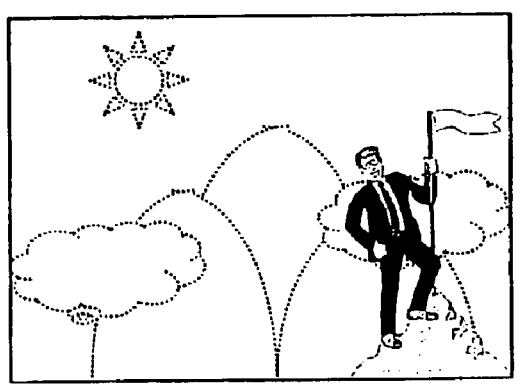
FIG. 5 is a diagram schematically showing a picture of a subject photographed in a back-lighting condition with the video camera shown in FIG. 1.
Figure 6:
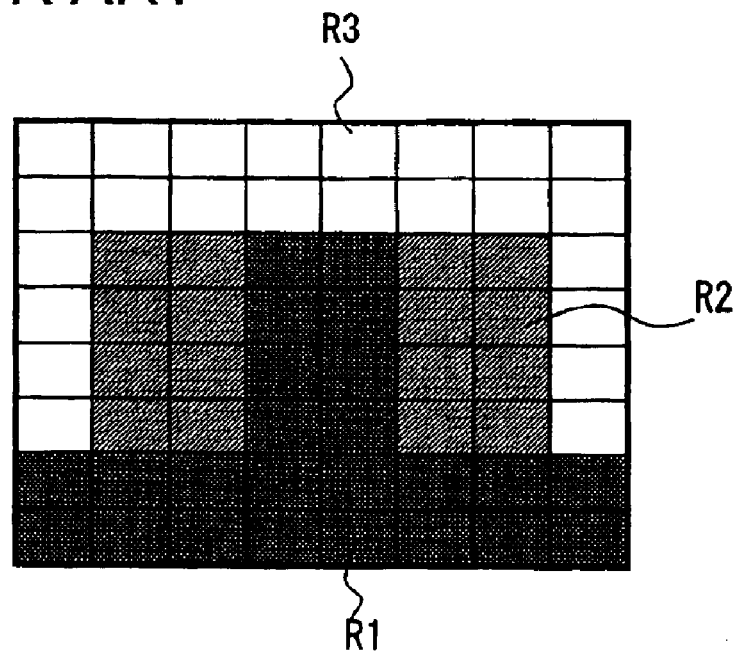
FIG. 6 is a diagram showing an example of how weight factors are set that are assigned to regions provided for back-lighting compensation in a conventional camera.
Figure 7:
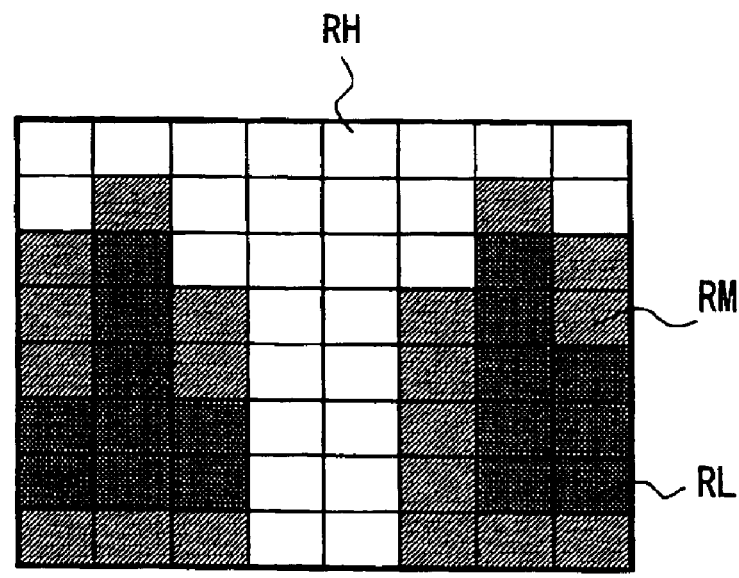
FIG. 7 is a diagram showing an example of brightness distribution that makes it impossible to photograph a subject with appropriate brightness even with back-lighting compensation in a conventional camera.
Figure 8A:
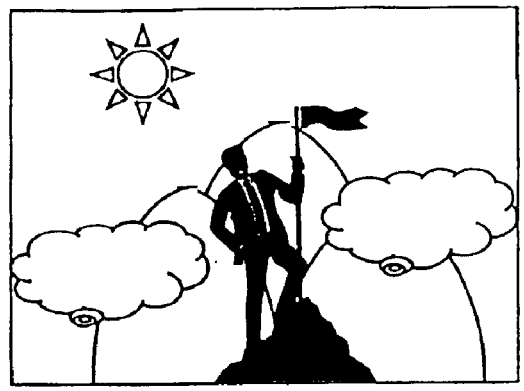
FIGS. 8A, 8B, and 8C are diagrams schematically showing pictures taken with a conventional camera, with FIG. 8A showing a picture taken without back-lighting compensation in a back-lighted condition, and FIGS. 8B and 8C showing pictures taken with back-lighting compensation in a back-lighted condition.
Figure 8B:
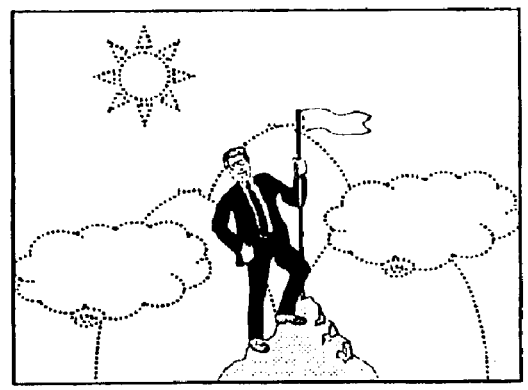
Figure 8C:
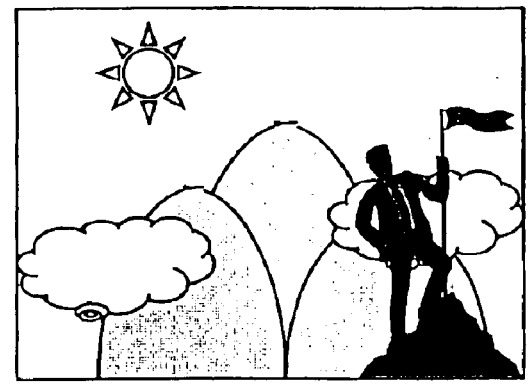

With the camera 1 of this embodiment, which is provided with a first mode in which AE control is performed as described above, it is possible to take a picture in which a subject with comparatively low brightness is photographed with appropriate brightness even when the brightness distribution within the area to be photographed is as shown in FIG. 7 described earlier. FIG. 5 shows a picture taken in the first mode under the same conditions as the picture shown in FIG. 8C.

It is to be understood that any numbers and values given specifically in the above descriptions, such as the number of regions into which the area to be photographed is divided, the reference values used to distinguish among the three conditions, etc., are mere examples, and may therefore be set otherwise. For example, in most cases, dividing the area to be photographed into 36 (vertically 6×horizontally 6) regions or more is sufficient to achieve correct distinction among the three conditions. However, using too many regions does not affect the result of distinction favorably, and therefore it is advisable to limit the number of regions to about 144 (vertically 12×horizontally 12) or less to save the amount of calculation that needs to be performed.

Figure 4:
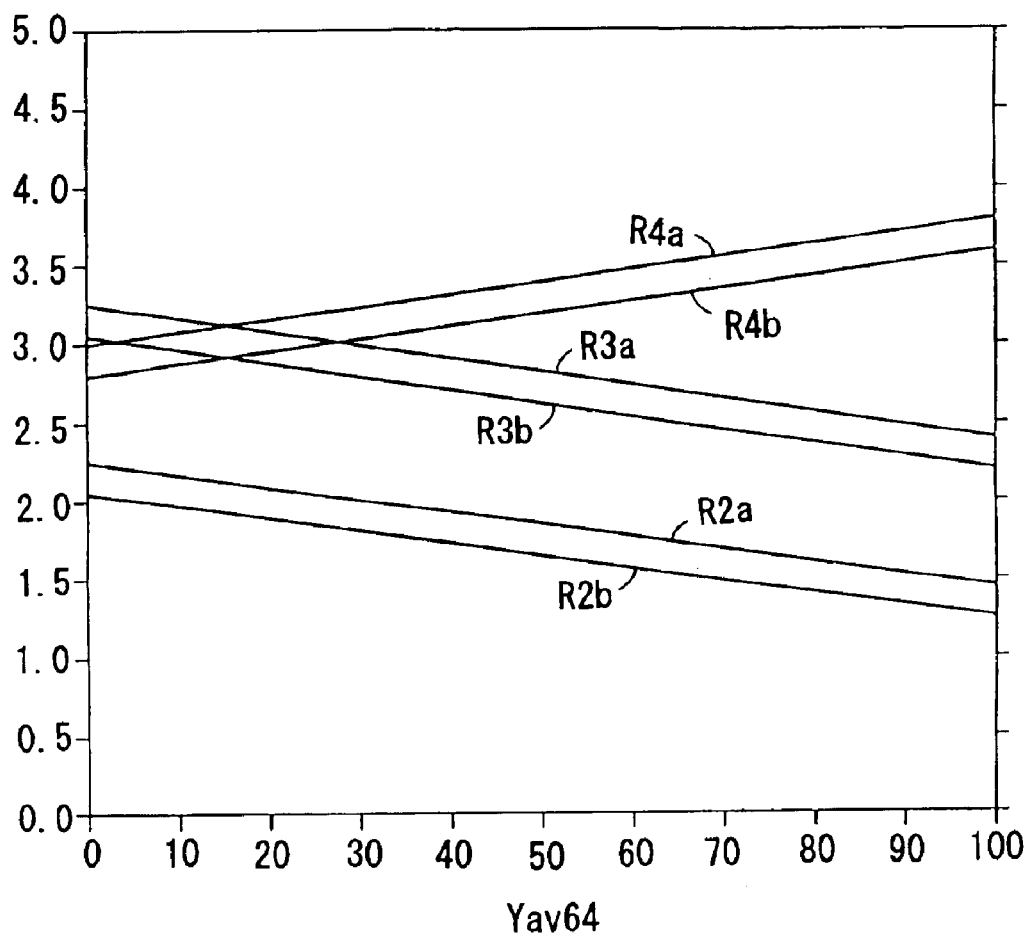
FIG. 4 is a diagram showing an example of how the reference values are set that are used to distinguish among different conditions in the video camera shown in FIG. 1.

In the embodiment described above, the reference values are chosen between constant values; however, they may be varied continuously according to the brightness over the whole area to be photographed. FIG. 4 shows an example of how the reference values are set in such a case. In FIG. 4, the horizontal axis indicates the average brightness Yav64 over all the regions, and the vertical axis indicates the values R2a, R2b, R3a, R3b, R4a, and R4b used as the reference values R2, R3, and R4. It is preferable to make the reference values R2 and R3, which are used to distinguish between the first and second conditions, smaller as the average brightness Yav64 becomes higher, and it is preferable to make the reference value R4, which is used to distinguish between the first and third conditions, greater as the average brightness Yav64 becomes higher. On the other hand, it is preferable to keep the reference value R1, which is used to distinguish between the fourth and fifth conditions, constant regardless of the brightness over the whole area to be photographed.

In the embodiment described above, the exposure of the CCD 12, serving as an image sensor, is varied by varying the aperture diameter of the aperture stop 11a; however, it is also possible to make the photoelectric conversion time of the CCD 12 (i.e. electronic shutter speed) variable and adjust the exposure thereof by varying the photoelectric conversion time thereof. It is also possible to adjust the exposure of the CCD 12 by varying both the aperture diameter of the aperture stop 11a and the photoelectric conversion time of the CCD 12.

Obviously, many modifications and variations of the present invention are possible in light of the above teachings. It is therefore to be understood that within the scope of the appended claims, the invention may be practiced other than as specifically described.

What is claimed is:

1. A camera that controls exposure of an image sensor in such a way that apparent brightness of a subject in a photographed picture is substantially constant regardless of actual brightness of the subject.

wherein the camera controls the exposure of the image sensor according to a result of distinguishing among a first condition in which there is little difference in brightness between the subject and a background, a second condition in which there is much difference in brightness between the subject and the background and in which the subject is less bright than the background, and a third condition in which there is much difference in brightness between the subject and the background and in which the subject is brighter than the background, and wherein the camera first distinguishes between a fourth condition including the first and second conditions and a fifth condition including the first and third conditions, and then distinguishes, when the fourth condition has been recognized, between the first and second conditions or, when the fifth condition has been recognized, between the first and third conditions.

2. A camera as claimed in claim 1, wherein an area to be photographed is divided into two, an upper and lower, portions each further divided into a plurality of regions, and the camera determines brightness in each of those regions and then determines an upper-portion average, which is an average of brightness in the regions belonging to the upper portion, and a lower-portion average, which is an average of brightness in the regions belonging to the lower portion, so that the camera recognizes the fourth condition when an upper-portion/lower portion ratio, which is a ratio of the upper-portion average to the lower portion average, is higher than a predetermined reference upper-portion/lower-portion ratio and recognizes the fifth condition when the upper-portion/lower-portion is not higher than the reference upper-portion/lower-portion ratio.

3. A camera as claimed in claim 2, wherein the reference upper-portion/lower-portion ratio is determined for each image frame, and the reference upper-portion/lower-portion ratio is made lower when the second condition was recognized in a most recent image frame than when the first or third condition was recognized.

4. A camera as claimed in claim 2, wherein the camera determines an overall average, which is an average of brightness over all the regions, a first dark-region average, which is an average of brightness in regions in which brightness is lower than the overall average, and a second dark-region average, which is an average of brightness in regions in which brightness is lower than the first dark-region average so that, when the fourth condition has been recognized, the camera recognizes the first condition when a first overall/dark-region ratio, which is a ratio of the overall average to the first dark-region average, is not higher than a first reference overall/dark-region ratio or when a second overall/dark-region ratio, which is a ratio of the overall average to the second dark-region average, is not higher than a second reference overall/dark-region ratio and recognizes the second condition when the first overall/dark-region ratio is higher than the first reference overall/dark-region ratio and in addition the second overall/dark-region ratio is higher than the second reference overall/dark ratio.

5. A camera as claimed in claim 4, wherein the first and second reference overall/dark-region ratios are made lower when the second condition was recognized in a most recent image frame than when the first condition was recognized.

6. A camera as claimed in claim 2, wherein the camera determines an overall average, which is an average of brightness over all the regions, a dark-region average, which is an average of brightness in regions in which brightness is lower than the overall average, and a bright-region average, which is an average of brightness in regions in which brightness is higher than the overall average so that, when the fifth condition has been recognized, the camera recognizes the first condition when a bright-region/dark-region ratio, which is a ratio of the bright-region average to the dark-region average, is not higher than a predetermined reference bright-region/dark-region ratio and recognizes the third condition when the bright-region/dark-region ratio is higher than the reference bright-region/dark-region ratio.

7. A camera as claimed in claim 6, wherein the reference bright-region/dark-region ratio is made lower when the third condition was recognized in a most recent image frame than when the first condition was recognized.

8. A camera that controls exposure of an image sensor in such a way that apparent brightness of a subject in a photographed picture is substantially constant regardless of actual brightness of the subject, wherein the camera controls the exposure of the image sensor according to a result of distinguishing among a first condition in which there is little difference in brightness between the subject and a background, a second condition in which there is much difference in brightness between the subject and the background and in which the subject is less bright than the background, and a third condition in which there is much difference in brightness between the subject and the background and in which the subject is brighter than the background, and wherein an area to be photographed is divided into a plurality of regions, and the camera determines brightness in each of those regions and then determines an overall average, which is an average of brightness over all the regions, a first dark-region average, which is an average of brightness in regions in which brightness is lower than the overall average, a second dark-region average, which is an average of brightness in regions in which brightness is lower than the first dark-region average, a first bright-region average, which is an average of brightness in regions in which brightness is higher than the overall average, and a second bright-region average, which is an average of brightness in regions in which brightness is higher than the first bright-region average so that the camera controls the exposure of the image sensor by using, as the brightness of the subject, the overall average when the first condition is recognized, the second dark-region average when the second condition is recognized, and the second bright-region average when the third condition is recognized.

9. A camera that controls exposure of an image sensor in such a way that apparent brightness of a subject in a photographed picture is substantially constant regardless of actual brightness of the subject, wherein the camera controls the exposure of the image sensor according to a result of distinguishing among a first condition in which there is little difference in brightness between the subject and a background, a second condition in which there is much difference in brightness between the subject and the background and in which the subject is less bright than the background, and a third condition in which there is much difference in brightness between the subject and the background and in which the subject is brighter than the background, wherein the camera first distinguishes between a fourth condition including the first and second conditions and a fifth condition including the first and third conditions, and then distinguishes, when the fourth condition has been recognized, between the first and second conditions or, when the fifth condition has been recognized, between the first and third conditions, wherein an area to be photographed is divided into two, an upper and lower, portions each further divided into a plurality of regions, and the camera determines brightness in each of those regions and then determines an upper-portion average, which is an average of brightness in the regions belonging to the upper portion, and a lower-portion average, which is an average of brightness in the regions belonging to the lower portion, so that the camera recognizes the fourth condition when an upper-portion/lower portion ratio, which is a ratio of the upper-portion average to the lower portion average, is higher than a predetermined reference upper-portion/lower-portion ratio and recognizes the fifth condition when the upper-portion/lower-portion is not higher than the reference upper-portion/lower-portion ratio, and wherein the reference upper-portion/lower-portion ratio is determined for each image frame, and the reference upper-portion/lower-portion ratio is made lower when the second condition was recognized in a most recent image frame than when the first or third condition was recognized.

10. A camera that controls exposure of an image sensor in such a way that apparent brightness of a subject in a photographed picture is substantially constant regardless of actual brightness of the subject, wherein the camera controls the exposure of the image sensor according to a result of distinguishing among a first condition in which there is little difference in brightness between the subject and a background, a second condition in which there is much difference in brightness between the subject and the background and in which the subject is less bright than the background, and a third condition in which there is much difference in brightness between the subject and the background and in which the subject is brighter than the background, wherein the camera first distinguishes between a fourth condition including the first and second conditions and a fifth condition including the first and third conditions, and then distinguishes, when the fourth condition has been recognized, between the first and second conditions or, when the fifth condition has been recognized, between the first and third conditions, wherein an area to be photographed is divided into two, an upper and lower, portions each further divided into a plurality of regions, and the camera determines brightness in each of those regions and then determines an upper-portion average, which is an average of brightness in the regions belonging to the upper portion, and a lower-portion average, which is an average of brightness in the regions belonging to the lower portion, so that the camera recognizes the fourth condition when an upper-portion/lower portion ratio, which is a ratio of the upper-portion average to the lower portion average, is higher than a predetermined reference upper-portion/lower-portion ratio and recognizes the fifth condition when the upper-portion/lower-portion is not higher than the reference upper-portion/lower-portion ratio.

11. A camera as claimed in claim 10, wherein the first and second reference overall/dark-region ratios are made lower when the second condition was recognized in a most recent image frame than when the first condition was recognized.

12. A camera that controls exposure of an image sensor in such a way that apparent brightness of a subject in a photographed picture is substantially constant regardless of actual brightness of the subject, wherein the camera controls the exposure of the image sensor according to a result of distinguishing among a first condition in which there is little difference in brightness between the subject and a background, a second condition in which there is much difference in brightness between the subject and the background and in which the subject is less bright than the background, and a third condition in which there is much difference in brightness between the subject and the background and in which the subject is brighter than the background, wherein the camera first distinguishes between a fourth condition including the first and second conditions and a fifth condition including the first and third conditions, and then distinguishes, when the fourth condition has been recognized, between the first and second conditions or, when the fifth condition has been recognized, between the first and third conditions, wherein an area to be photographed is divided into two, an upper and lower, portions each further divided into a plurality of regions, and the camera determines brightness in each of those regions and then determines an upper-portion average, which is an average of brightness in the regions belonging to the upper portion, and a lower-portion average, which is an average of brightness in the regions belonging to the lower portion, so that the camera recognizes the fourth condition when an upper-portion/lower portion ratio, which is a ratio of the upper-portion average to the lower portion average, is higher than a predetermined reference upper-portion/lower-portion ratio and recognizes the fifth condition when the upper-portion/lower-portion is not higher than the reference upper-portion/lower-portion ratio, and wherein the camera determines an overall average, which is an average of brightness over all the regions, a dark-region average, which is an average of brightness in regions in which brightness is lower than the overall average, and a bright-region average, which is an average of brightness in regions in which brightness is higher than the overall average so that, when the fifth condition has been recognized, the camera recognizes the first condition when a bright-region/dark-region ratio, which is a ratio of the bright-region average to the dark-region average, is not higher than a predetermined reference bright-region/dark-region ratio and recognizes the third condition when the bright-region/dark-region ratio is higher than the reference bright-region/dark-region ratio.

13. A camera as claimed in claim 12, wherein the reference bright-region/dark-region ratio is made lower when the third condition was recognized in a most recent image frame than when the first condition was recognized.

* * * * *